S. BOYER.
PLOW HITCH.
APPLICATION FILED SEPT. 22, 1908.
919,121.
Patented Apr. 20, 1909.
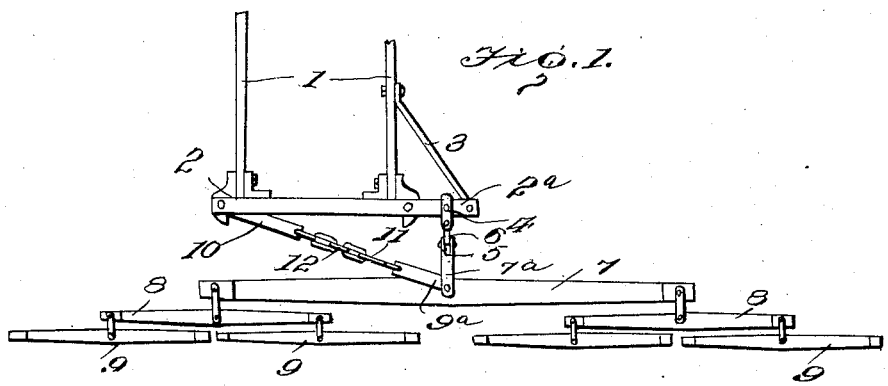
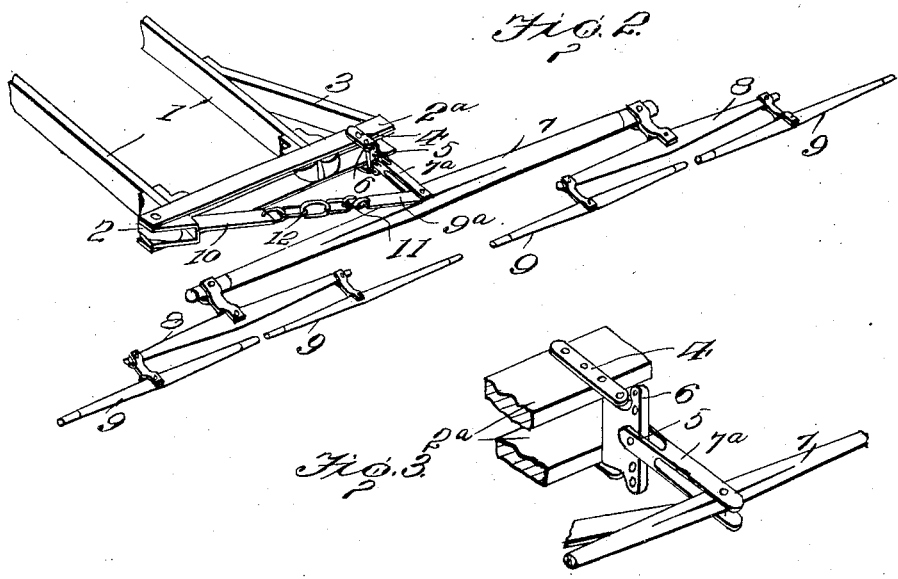
Witnesses
Inventor
S. Boyer:
By
Attorneys

UNITED STATES PATENT OFFICE.

SOLOMON BOYER, OF EVANSVILLE, INDIANA.

PLOW-HITCH.

No. 919,121.　　　　Specification of Letters Patent.　　　Patented April 20, 1909.

Application filed September 22, 1908. Serial No. 454,174.

*To all whom it may concern:*

Be it known that I, SOLOMON BOYER, citizen of the United States, residing at Evansville, in the county of Vanderburg and State of Indiana, have invented certain new and useful Improvements in Plow-Hitches, of which the following is a specification.

In the practical use of gang plows considerable difficulty is encountered in obtaining sufficient space in the ordinary hitch so that four horses can walk in a straight line and exert a direct pull without being crowded.

The object of the present invention has been to overcome this difficulty by the provision of a novel hitch which provides a broader hitching space and gives sufficient room for the horses to walk in a straight line without crowding, all side draft upon the plow being at the same time eliminated.

For a full understanding of the invention and the merits thereof and also to acquire a knowledge of the details of construction and the means for effecting the result, reference is to be had to the following description and accompanying drawings, in which:

Figure 1 is a top plan view of the plow hitch, showing the same applied to the forward end of the gang plow. Fig. 2 is a perspective view of the same. Fig. 3 is an enlarged detail view of the clevis.

Corresponding and like parts are referred to in the following description and indicated in all the views of the drawings by the same reference characters.

For the purpose of illustration, the invention is shown as applied to a gang plow which is formed with the two spaced and longitudinally disposed plow beams 1, the draft being applied to the forward ends of these beams. A pair of cross bars 2 connect the forward extremities of the beams 1, the said cross bars being secured to the top and bottom, respectively, of the beams and projecting laterally upon one side of the same, as indicated at 2ª. The extremity of the laterally projecting ends 2ª of the transverse bars 2 are connected to the adjacent plow beam 1 by means of the diagonal brace members 3. A clip 4 is secured to the end 2ª of the transverse bar and attached to this clip is an adjustable clevis 6.

A whiffletree 7 is pivoted upon a bar 7ª which is adjustably connected to the clevis and may be raised or lowered, as desired, by inserting the bolt 5 of the clevis through any selected one of the openings therein. In the present instance, a double-tree 8 is connected to each end of the whiffletree and each of the double-trees carries a pair of swingletrees 9. A rod 9ª is connected to the forward end of the bar 7ª and a similar rod 10 is connected to the opposite end of the transverse bar 2 to that having the clip 4 applied thereto. A hook 11 is loosely connected to the extremity of the rod 9ª and is designed to engage any selected link of a chain 12 connected to the rod 10. In this manner all side draft is prevented and the plows are caused to follow the draft animals in a straight line without swinging to one side. Such a construction has the advantage of enabling the line of draft to be thrown outside of the space between the plow beams, and the horses are thereby given ample room so that they can walk in a straight line without being crowded.

Having thus described the invention, what is claimed as new is:—

1. The combination of a plow formed with a pair of plow beams, a transverse bar connecting the plow beams and projecting laterally upon one side thereof, a brace connecting the laterally projecting end of the transverse bar to the adjacent plow beam, a clevis carried by the laterally projecting end of the transverse bar, a bar adjustably secured to the clevis, a whiffletree connected to the bar, and means for adjustably connecting the bar to the opposite end of the transverse bar to that carrying the clevis.

2. The combination of a plow formed with a pair of plow beams, a transverse bar connecting the plow beams and projecting laterally upon one side thereof, a brace connecting the laterally projecting end of the transverse bar to the adjacent plow beam, a clevis carried by the laterally projecting end of the transverse bar, a bar adjustably connected to the clevis, a whiffletree carried by the bar, a rod connected to the bar, a second rod connected to the opposite end of the transverse bar to that carrying the clevis, and means for adjustably connecting the two rods.

In testimony whereof I affix my signature in presence of two witnesses.

SOLOMON BOYER. [L. S.]

Witnesses:
　CHAS. WAHNSIEDER,
　OTTO G. GEISS.